United States Patent
Nakamura

(10) Patent No.: US 9,476,737 B2
(45) Date of Patent: Oct. 25, 2016

(54) ENCODER, APPARATUS INCLUDING THE ENCODER, ENCODER CALCULATION METHOD AND STORAGE MEDIUM STORING ENCODER CALCULATION PROGRAM

(71) Applicant: CANON PRECISION INC., Hirosaki-shi (JP)

(72) Inventor: Hitoshi Nakamura, Kawasaki (JP)

(73) Assignee: CANON PRECISION, INC., Aomori-Ken (JP)

( * ) Notice: Subject to any disclaimer, the term of this patent is extended or adjusted under 35 U.S.C. 154(b) by 200 days.

(21) Appl. No.: 14/553,995

(22) Filed: Nov. 25, 2014

(65) Prior Publication Data
US 2015/0198467 A1  Jul. 16, 2015

(30) Foreign Application Priority Data

Jan. 10, 2014  (JP) ................................ 2014-003450

(51) Int. Cl.
*G01D 5/347*  (2006.01)

(52) U.S. Cl.
CPC ........ *G01D 5/34715* (2013.01); *G01D 5/3473* (2013.01)

(58) Field of Classification Search
CPC ............. G01D 5/347; G01D 5/34707; G01D 5/34715; G01D 5/3473; G01D 5/34746
USPC .................. 250/231.1–231.18, 237 G, 237 R
See application file for complete search history.

(56) References Cited

U.S. PATENT DOCUMENTS

| 5,252,825 A | * | 10/1993 | Imai | ...................... H03M 1/143 250/231.18 |
| 5,563,408 A | * | 10/1996 | Matsumoto | .......... G01D 5/2455 250/231.14 |

(Continued)

FOREIGN PATENT DOCUMENTS

| DE | 4123722 A1 | 1/1992 |
| EP | 2662668 A2 | 11/2013 |

(Continued)

OTHER PUBLICATIONS

Extended European Search Report, Jun. 19, 2015, Reference EP73498, Application No./Patent No. 14194241.7-1558 / 2894437, Applicant/Proprietor Canon Precision Inc., pp. 1-6.

*Primary Examiner* — Seung C Sohn
(74) *Attorney, Agent, or Firm* — Canon USA, Inc. I.P. Division

(57) ABSTRACT

The encoder includes a scale provided with multiple periodic patterns having mutually different periods, a sensor outputting, with a relative movement between the scale and the sensor, multiple periodic signals periodically changing respectively corresponding to the periods of the periodic patterns, and a signal processor calculating a detected movement amount as a detected relative movement amount between the scale and the sensor. The signal processor calculates, by using each of the periodic signals, an accumulated movement amount which is an accumulated value of the relative movement amount between the scale and the sensor in units of one over an integer of the period of the periodic pattern corresponding to the periodic signal used, unifies the units of the accumulated movement amounts calculated by using the respective periodic signals, and calculates the detected movement amount from the accumulated movement amounts with the unified units.

8 Claims, 7 Drawing Sheets

(56) References Cited

U.S. PATENT DOCUMENTS

| | | | |
|---|---|---|---|
| 7,687,765 B2 * | 3/2010 | Sugiyama | G01D 5/34792 250/208.1 |
| 7,943,897 B2 * | 5/2011 | Okada | G01D 5/34746 250/231.13 |
| 8,729,458 B2 | 5/2014 | Kato | |
| 2013/0292557 A1 | 11/2013 | Nakamura | |

FOREIGN PATENT DOCUMENTS

| | | |
|---|---|---|
| JP | H05-196479 A | 8/1993 |
| JP | 2001-174289 A | 6/2001 |
| JP | 2005-345375 A | 12/2005 |
| JP | 2006-170788 A | 6/2006 |
| JP | 2012-83153 A | 4/2012 |
| JP | 2013-134175 A | 7/2013 |
| JP | 2013-231703 A | 11/2013 |

* cited by examiner

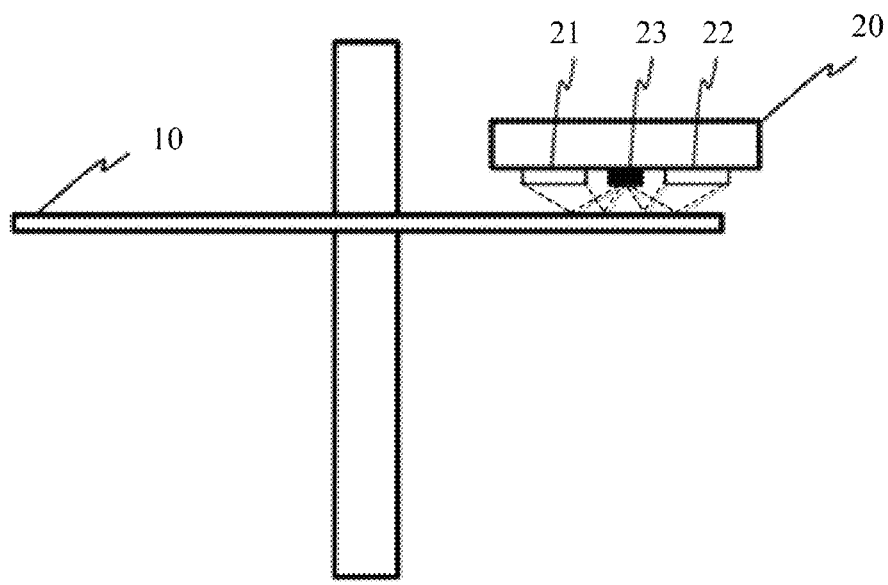
FIG. 3
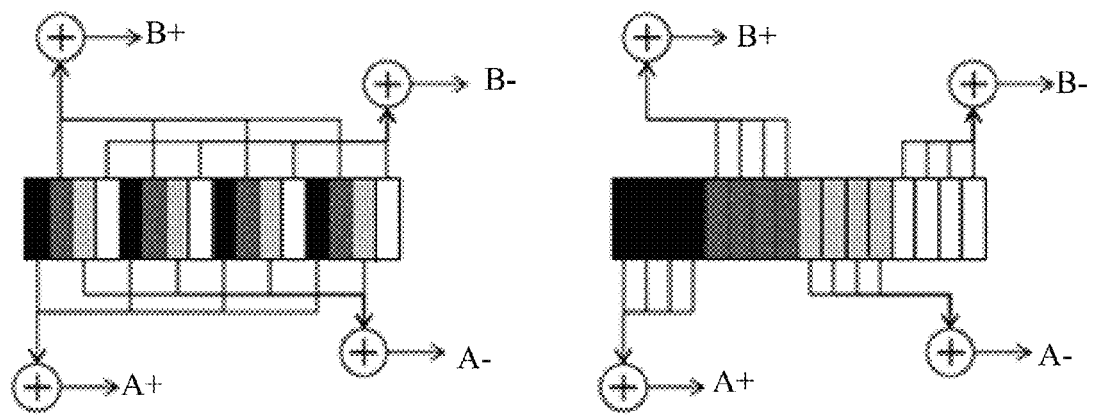
FIG. 4A
FIG. 4B

ENCODER, APPARATUS INCLUDING THE ENCODER, ENCODER CALCULATION METHOD AND STORAGE MEDIUM STORING ENCODER CALCULATION PROGRAM

BACKGROUND OF THE INVENTION

1. Field of the Invention

The present invention relates to an encoder to be mounted in various apparatuses such as an optical apparatus and to be used to detect a movement amount, a position and a velocity of a movable member provided in the apparatus.

2. Description of the Related Art

Such an encoder includes a scale provided with a periodic pattern including multiple gratings periodically arranged, and a sensor that outputs a periodic signal that periodically changes with the periodic pattern in response to a movement relative to the scale. The encoder further includes a signal processor that calculates a relative movement amount (detected value) between the scale and the sensor by using the periodic signal output from the sensor.

In such an encoder, when a positional relation between the sensor and the scale is not in an ideal state, the detected value may contain an error. Japanese Patent Laid-open No. 2012-83153 discloses an encoder including multiple sensors (light-receiving element arrays) and configured to calculate, by weighted averaging of positions respectively detected using outputs of the sensors based on values of the sensor outputs, a position as a detected value with a reduced error.

However, another encoder includes a scale provided with multiple periodic patterns that have mutually different periods and are arranged adjacent to each other. In this encoder, the number of gratings in each periodic pattern and an accumulated change amount of a phase representing a position in a range corresponding to one grating are used to calculate a detected value such as a position. However, the method disclosed by Japanese Patent Laid-open No. 2012-83153 cannot be applied to such an encoder.

This is because a movement amount is not the detected value calculated from the number of gratings and the accumulated change amount of the phase, but is calculated from the detected value and a grating pitch. In other words, even if the same detected values are obtained, different grating pitches provides different movement amounts, and thereby the same detected values do not correspond to a same position. For example, a position moved by one period from a reference position for a sensor reading a periodic pattern whose period is 99 μm is different from a position moved by one period from the reference position for a sensor reading a periodic pattern whose period is 100 μm.

SUMMARY OF THE INVENTION

The present invention provides an encoder that includes a scale provided with multiple periodic patterns having mutually different periods and is capable of accurately calculating detected values such as a movement amount and a position irrespective of a phase relation between the periodic patterns.

The present invention provides as an aspect thereof an encoder including a scale provided with multiple periodic patterns having mutually different periods, a sensor configured to be movable relative to the scale and to output, with a relative movement therebetween, multiple periodic signals periodically changing respectively corresponding to the periods of the periodic patterns, and a signal processor configured to calculate, by using the periodic signals, a detected movement amount as a detected value of a relative movement amount between the scale and the sensor. The signal processor calculates, by using each of the periodic signals, an accumulated movement amount which is an accumulated value of the relative movement amount between the scale and the sensor in units of one over an integer of the period of the periodic pattern corresponding to the periodic signal used, unifies the units of the accumulated movement amounts calculated by using the respective periodic signals, and calculates the detected movement amount from the accumulated movement amounts with the unified units.

The present invention provides as another aspect thereof an apparatus including the above encoder, and a movable member whose movement amount or position is detected by the encoder.

The present invention provides as yet another aspect thereof an encoder calculation method applied to an encoder including a scale provided with multiple periodic patterns having mutually different periods, and a sensor configured to be movable relative to the scale and to output, with a relative movement therebetween, multiple periodic signals periodically changing respectively corresponding to the periods of the periodic patterns. The method is used to calculate, by using the periodic signals, a detected movement amount as a detected value of a relative movement amount between the scale and the sensor. The method includes calculating, by using each of the periodic signals, an accumulated movement amount which is an accumulated value of the relative movement amount between the scale and the sensor in units of one over an integer of the period of the periodic pattern corresponding to the periodic signal used, unifying the units of the accumulated movement amounts calculated by using the respective periodic signals, and calculating the detected movement amount from the accumulated movement amounts with the unified units.

The present invention provides as still another aspect thereof a non-transitory computer-readable storage medium storing an encoder calculation program as a computer program to be used for an encoder including a scale provided with multiple periodic patterns having mutually different periods, a sensor configured to be movable relative to the scale and to output, with a relative movement therebetween, multiple periodic signals periodically changing respectively corresponding to the periods of the periodic patterns, and a signal processor to which the periodic signals are input. The program causes the signal processor as a computer to perform a process to calculate, by using the periodic signals, a detected movement amount as a detected value of a relative movement amount between the scale and the sensor. The process includes calculating, by using each of the periodic signals, an accumulated movement amount which is an accumulated value of the relative movement amount between the scale and the sensor in units of one over an integer of the period of the periodic pattern corresponding to the periodic signal used, unifying the units of the accumulated movement amounts calculated by using the respective periodic signals, and calculating the detected movement amount from the accumulated movement amounts with the unified units.

Other aspects of the present invention will be apparent from the embodiments described below with reference to the drawings.

BRIEF DESCRIPTION OF THE DRAWINGS

FIG. 3 illustrates an optical system in the encoder of Embodiment 1.

FIGS. 4A and 4B illustrate connections of light-receiving elements in the encoder of Embodiment 1.

DESCRIPTION OF THE EMBODIMENTS

Exemplary embodiments of the present invention will be described below with reference to the attached drawings.

Embodiment 1

Figure 1:
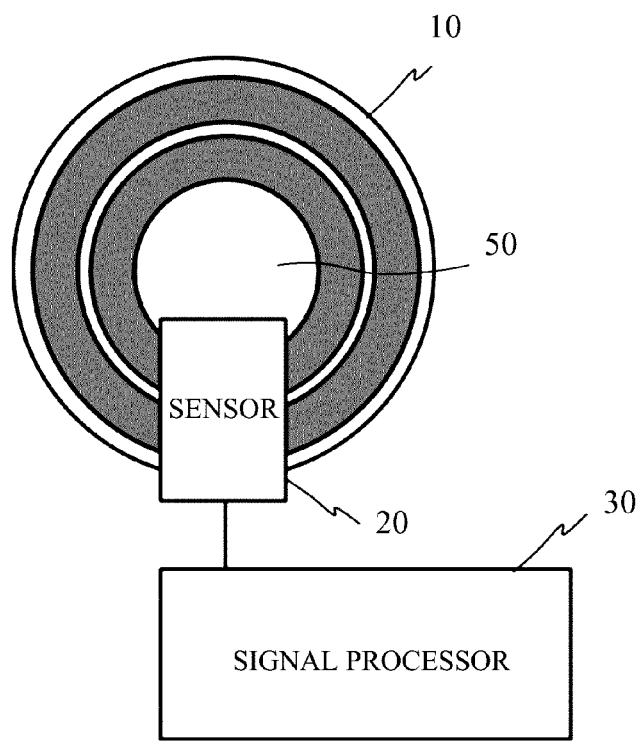
FIG. 1 illustrates a configuration of an encoder that is Embodiment 1 of the present invention.

FIG. 1 illustrates an encoder that is a first embodiment (Embodiment 1) of the present invention. The encoder includes a scale 10, a sensor 20 and a signal processor 30. The encoder of this embodiment is an optical reflective incremental encoder that detects a relative movement between the scale 10 and the sensor 20, that is, a relative position therebetween. The encoder is mounted on various apparatuses including optical apparatuses such as an interchangeable lens and an image pickup apparatus and including a robotic arm and a carrier apparatus.

This embodiment describes a rotary encoder that detects, as the relative position, a rotation angle of a rotation axis 50 as a movable member in any apparatus described above, in which the scale 10 is attached to the rotation axis 50 so as to integrally rotate therewith, and the sensor 20 is attached to a fixing member such as a casing of the apparatus. The scale 10 may be attached to the fixing member, whereas the sensor 20 may be attached to the rotation axis 50 so as to integrally rotate therewith.

Figure 2:
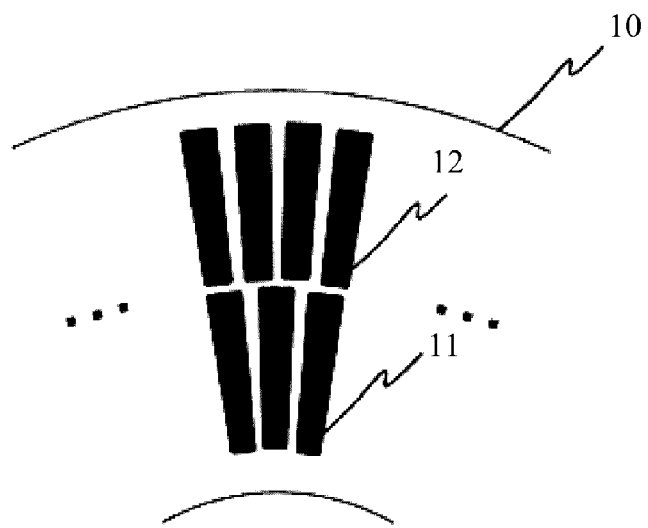
FIG. 2 illustrates periodic patterns of a scale in the encoder of Embodiment 1.

FIG. 2 is an enlarged view of part of multiple (two in this embodiment) concentric ring pattern tracks 11 and 12 provided on the scale 10. The pattern tracks (hereinafter, simply referred to as tracks) 11 and 12 are each provided with a periodic pattern including a reflective portion (black portion in FIG. 2) as a grating and a non-reflective portion (white portion in FIG. 2) are alternately arranged in a circumferential direction. The periodic pattern (first periodic pattern) of the track 11 includes 736 gratings in one round, and the periodic pattern (second periodic pattern) of the track 12 includes 785 gratings in one round. Thus, a period (=360°/736) of the periodic pattern of the track 11 is different from a period (=360°/785) of the periodic pattern of the track 12.

Hereinafter, a period direction of the tracks 11 and 12, that is, a circumferential direction of the scale 10 is referred to as a detection direction.

In the sensor 20, as illustrated in FIG. 3, multiple (two) light receivers 21 and 22 and one light source 23 are arranged on a same plane. Light projected from the light source 23 onto the track 11 and reflected by the reflective portions of the track 11 is received by the light receiver 21. Light projected from the light source 23 onto the track 12 and reflected by the reflective portions of the track 12 is received by the light receiver 22. The light receivers 21 and 22 each include a light-receiving element array constituted by multiple light-receiving elements arranged in the detection direction. When the scale 10 and the sensor 20 are relatively moved, an intensity of the reflected light received by each light-receiving element in the light receivers 21 and 22 changes depending on the relative movement amount. The sensor 20 outputs a sinusoidal signal (first periodic signal) whose value periodically changes with change of the light-receiving intensity in the light receiver 21 and outputs a sinusoidal signal (second periodic signal) whose value periodically changes with change of the light-receiving intensity in the light receiver 22.

More specifically, in the light receivers 21 and 22, each light-receiving element has a width of $\lambda/2$ in the detection direction. The width $\lambda$ is sufficiently close to both the period (=360°/736) of the periodic pattern of the track 11 and the period (=360°/785) of the periodic pattern of the track 12.

This embodiment employs a reflective optical system in which the light source 23 and the light receivers 21 and 22 are arranged on the same plane on the sensor 20. Thus, an image (periodic pattern image) of each track projected onto each light receiver by the light projected from the light source 23 onto the track and reflected thereby has a doubled size of the track on the scale 10. That is, the width $\lambda/2$ in the detection direction on each light receiver corresponds to $\lambda/4$ on the corresponding track.

In this embodiment, outputs from the multiple light-receiving elements in each light receiver are divided into four of A(+), B(+), A(−) and B(−), and differences below are calculated:

$$A = A(+) - A(-)$$

$$B = B(+) - B(-)$$

In this manner, the light receiver 21 outputs, as the first periodic signal, two-phase signals (A and B) that are two-phase sinusoidal signals having a phase difference of 90° (that is, being mutually orthogonal). Similarly, the light receiver 22 outputs, as the second periodic signal, two-phase signals (A and B) that are two-phase sinusoidal signals that are mutually orthogonal. Thus, the two light receivers 21 and 22 output two pairs of two two-phase signals.

FIG. 4A illustrates a method of extracting the outputs (A(+), B(+), A(−) and B(−)) from the light-receiving elements in each light receiver at reading of the periodic pattern having the period $\lambda$. To read the periodic pattern having the period $\lambda$ and produce two-phase sinusoidal signals that are mutually orthogonal, it is enough to extract signals corresponding to light-receiving intensities at positions separated by $\lambda/2$ in the detection direction. Specifically, as illustrated in FIG. 4A, for each set of four adjacent light-receiving elements among the light-receiving elements in each light receiver, outputs from the four light-receiving elements are extracted as A(+), B(+), A(−) and B(−) in order in the detection direction. The sensor 20 outputs a signal representing a light-receiving intensity at a specific position on each light receiver. Thus, even if the sensor 20 is shifted to a position in a radial direction of the scale 10 and hence the period of the track read at the position is somewhat shifted from the width $\lambda$, two-phase signals having a period corresponding to the number of gratings in one round of the scale 10 are produced.

In FIG. 1, the signal processor 30 performs a movement amount detection process by using the two pairs of two-phase signals from the sensor 20 (light receivers 21 and 22) and outputs a rotation angle (relative movement) of the rotation axis 50.

Figure 5:
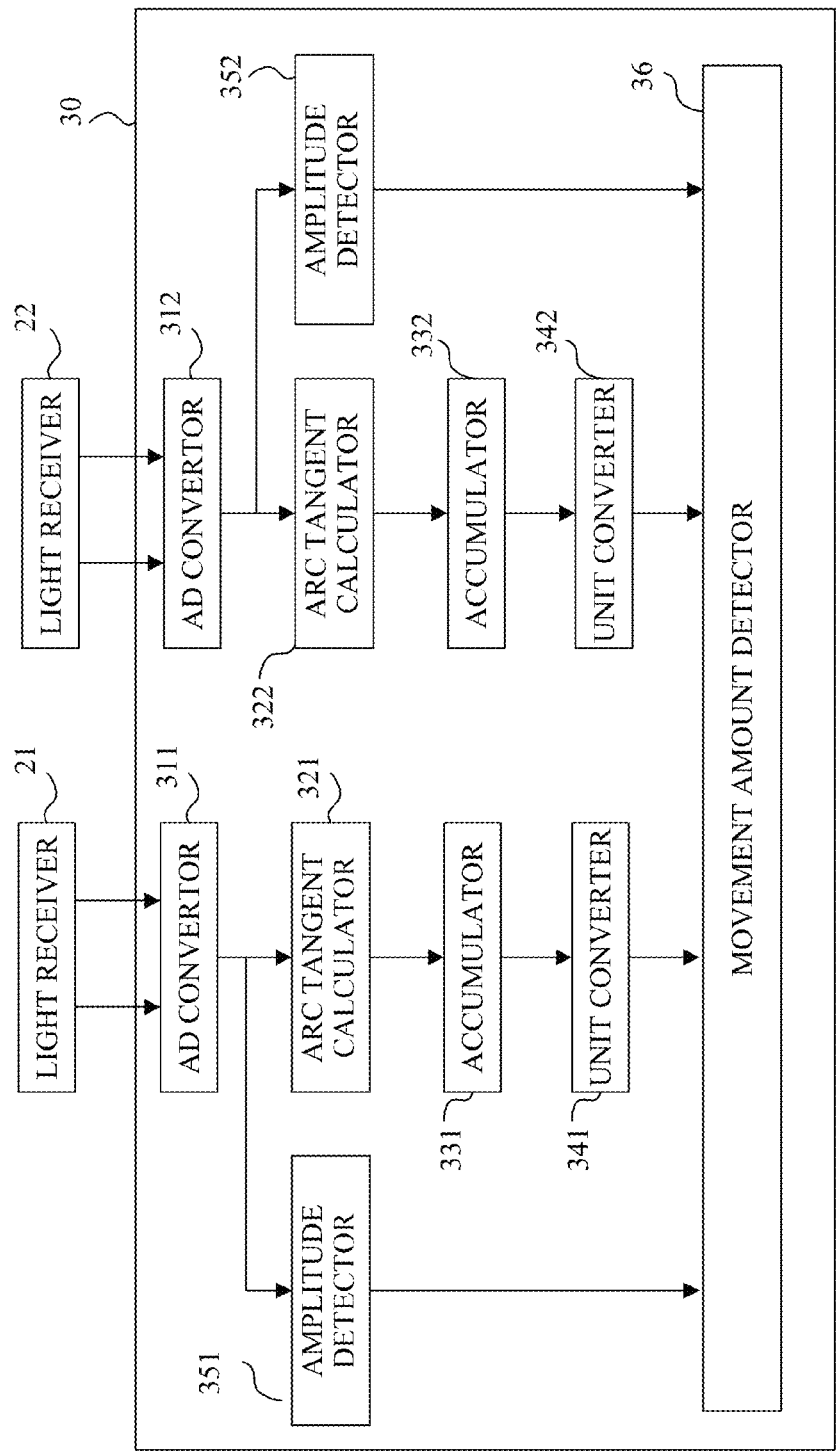
FIG. 5 illustrates a configuration of a signal processor in the encoder of Embodiment 1.

The signal processor 30 includes, as illustrated in FIG. 5, an AD convertor 311 to which two-phase signals (analog signals) from the light receiver 21 are input and an AD convertor 312 to which two-phase signals (analog signals) from the light receiver 22 are input. The signal processor 30 includes an arc tangent calculator 321, an accumulator 331, a unit converter 341 and an amplitude detector 351 which process two-phase signals (digital signals) output from the AD convertor 311. The signal processor 30 further includes an arc tangent calculator 322, an accumulator 332, a unit converter 342 and an amplitude detector 352 which process two-phase signals (digital signals) output from the AD convertor 312. The signal processor 30 additionally includes a movement amount detector 36 to which signals from the unit converters 341 and 342 and the amplitude detectors 351 and 352 are input.

The signal processor 30 is configured by a computer and executes, according to an encoder calculation program as a computer program, processes at the AD convertors 311 and 312, the arc tangent calculators 321 and 322, the accumulators 331 and 332, the unit converters 341 and 342, the amplitude detectors 351 and 352 and the movement amount detectors 36. In other words, the AD convertors 311 and 312, the arc tangent calculators 321 and 322, the accumulators 331 and 332, the unit converters 341 and 342, the amplitude detectors 351 and 352 and the movement amount detectors 36 represent multiple process steps involved in the movement amount detection process performed by the signal processor 30.

Next, description will be made of the movement amount detection process (a movement amount detection method as a encoder calculation method) performed by the signal processor 30. In the signal processor 30, each of the AD convertors 311 and 312 converts the two-phase signals from each of the light receivers 21 and 22 into digital signals. The AD convertors 311 and 312 operate at predetermined (constant) time intervals, and subsequent processes are performed per this conversion. In description below, values of the two-phase signals after digital conversion through the AD convertors 311 and 312 are respectively represented by $(x_{1,i}, y_{1,i})$ and $(x_{2,i}, y_{2,i})$. The variable i is a natural number indicating the number of conversions at the AD convertors 311 and 312.

Each of the arc tangent calculators 321 and 322 calculates a phase of the two-phase signals output from each of the AD convertors 311 and 312. Since the two-phase signals are mutually orthogonal sinusoidal signals, arc tangent calculation provides a phase that represents a position in one period. In this embodiment, the phase is expressed in 8 bits, that is, an integer value ranging from 0 to 255. The phases respectively calculated from the two-phase signals from the light receivers 21 and 22 (AD convertors 311 and 312) are respectively represented by $p_{1,i}$ and $p_{2,i}$.

Each of the accumulators 331 and 332 calculates, at each operation timing of the AD convertors 311 and 312 (that is, at the predetermined time intervals), a change amount of the phase (hereinafter referred to as "a phase change amount") calculated by each of the arc tangent calculators 321 and 322 and accumulates the phase change amount. The encoder of this embodiment cannot calculate the movement amount (rotation angle) only by using the phases calculated by the arc tangent calculators 321 and 322, and can calculate the movement amount by accumulating the phase change amount. The accumulated phase change amount is hereinafter referred to as "a phase accumulated value". Each of the accumulators 331 and 332 calculates, each time when an i-th phase is calculated by each of the arc tangent calculators 321 and 322, a difference between the i-th phase and an (i−1)-th phase and accumulates the difference to acquire the phase accumulated value.

The numbers of gratings included in the periodic patterns provided to the tracks 11 and 12 are respectively 736 and 785. Thus, a unit of the phase change amount and the phase accumulated value calculated by the accumulator 331 is 360/(736t×256) degrees, and a unit of the phase change amount and the phase accumulated value calculated by the accumulator 332 is 360/(785×256) degrees. In this manner, each of the accumulators 331 and 332 calculates the phase change amount representing the relative movement amount between the scale 10 and the sensor 20 in every predetermined time interval in units of one over an integer of the period of each the periodic patterns of the tracks 11 and 12. Each of the accumulators 331 and 332 accumulates the phase change amounts thus calculated at the predetermined time intervals to acquire the phase accumulated value (accumulated movement amount).

However, since a zero-th phase does not exist, the zero-th phase as an initial value is set to zero. The phase changes its value in a range (predetermined range) from 0 to 255 and is wrapped when decreasing below 0 and increasing beyond 255. In this embodiment, when the difference between the i-th and (i−1)-th phases becomes 128 or more or becomes −129 or less, the phase is determined to be wrapped, and the difference of the phases (hereinafter referred to as "a phase difference") is normalized to a range from −128 to +127. For example, the phase difference when the phase changes from 5 to 10 is (10−5=)+5, and the phase difference when the phase changes from 5 to 255 is (since 255−5=250≥128, 250−256=)−6.

Moreover, in this embodiment, the phase accumulated value is also wrapped every one rotation of the scale 10 relative to the sensor 20. Since the numbers of gratings of the tracks 11 and 12 are respectively 736 and 785, the phase accumulated values corresponding to the tracks 11 and 12 are respectively wrapped when exceeding 736×256−1 and 785×256−1. This wrapping of the phase accumulated value is represented by following expressions (1) to (3) where the phase accumulated values are represented by $a_{1,i}$ and $a_{2,i}$. In the expressions, $a_{1,0}=0$, $p_{1,0}=0$, $a_{2,0}=0$ and $p_{2,0}=0$, and MOD (x, y) represents a remainder when x is a dividend and y is a divisor.

$$a_{1,i} = MOD(a_{1,i-1} + \mathit{diff}(p_{1,i}, p_{1,i-1}), 736 \times 256) \tag{1}$$

$$a_{2,i} = MOD(a_{2,i-1} + \mathit{diff}(p_{2,i}, p_{2,i-1}), 785 \times 256) \tag{2}$$

$$\mathit{diff}(x, y) = \begin{cases} x - y & (-128 \le x - y \le 127) \\ x - y + 256 & (x - y < -128) \\ x - y - 256 & (x - y > 127) \end{cases} \tag{3}$$

The unit converters 341 and 342 unify the units of the phase accumulated values calculated by the accumulators 331 and 332. In this embodiment, the phase accumulated values calculated by the accumulators 331 and 332 are both converted to values whose unit is 0.01 degree. As described above, the units (before the conversion) of the phase accumulated values calculated by the accumulators 331 and 332 are respectively 360/(736×256) degrees and 360/(785×256) degrees. The unit converter 341 multiplies the phase accumulated value calculated by the accumulator 331 by 0.01/ (360/(736×256)). Similarly, the unit converter 342 multiplies the phase accumulated value calculated by the accumulator 332 by 0.01/(360/(785×256)). In this manner, the units of the phase accumulated values calculated by the accumulators 331 and 332 are converted to 0.01 degree.

These calculations are represented, when the phase accumulated values converted to be in the unit of 0.01 degree by the unit converters 341 and 342 are respectively denoted by $d_{1,i}$ and $d_{2,i}$, by following expressions (4) and (5). In these expressions, ROUND(x) represents rounding of x to a nearest integer.

$$d_{1,i} = \text{ROUND}\left(a_{1,i} \times 0.01 \div \frac{360}{736 \times 256}\right) \quad (4)$$

$$d_{2,i} = \text{ROUND}\left(a_{2,i} \times 0.01 \div \frac{360}{785 \times 256}\right) \quad (5)$$

Each of the amplitude detectors 351 and 352 detects an amplitude of the two-phase signals from each of the AD convertors 311 and 312. Specifically, the amplitude detectors 351 and 352 respectively calculates, from the two-phase signals $(x_{1,i}, y_{1,i})$ and $(x_{2,i}, y_{2,i})$ output from the AD convertors 311 and 312, Lissajous radii $r_{1,i}$ and $r_{2,i}$ as their amplitudes, as represented in expressions (6) and (7).

$$r_{1,i} = \sqrt{x_{1,i}^2 + y_{1,i}^2} \quad (6)$$

$$r_{2,i} = \sqrt{x_{2,i}^2 + y_{2,i}^2} \quad (7)$$

The movement amount detector 36 calculates, by using the amplitudes $r_{1,i}$ and $r_{2,i}$ calculated by the amplitude detectors 351 and 352 and the phase accumulated values $d_{1,i}$ and $d_{2,i}$ whose units are unified by the unit converters 341 and 342, a rotation angle (detected movement) $\theta$ as a detected value of the relative movement between the scale 10 and the sensor 20.

The movement amount detector 36 outputs, when the amplitudes $r_{1,i}$ and $r_{2,i}$ detected by the amplitude detectors 351 and 352 are both in a normal range described later, an average value of the phase accumulated values $d_{1,i}$ and $d_{2,i}$ as the rotation angle $\theta$. When one of the amplitudes $r_{1,i}$ and $r_{2,i}$ is in the normal range and the other is out of the normal range, the movement amount detector 36 outputs a phase accumulated value calculated from the two-phase signals having the amplitude in the normal range as the rotation angle $\theta$. When the amplitudes $r_{1,i}$ and $r_{2,i}$ are both out of the normal range, the movement amount detector 36 outputs an error. In this embodiment, the rotation angle $\theta$ is expressed as a value in a range from 0 to 359.99 degrees, and the error is expressed as −0.01 degree. The normal range of an amplitude has a upper limit th and a lower limit tl, and a value in this normal range is determined to be in the normal range.

The phase accumulated values $d_{1,i}$ and $d_{2,i}$ both take values in the range from 0 to 359.99, and each value is wrapped when exceeding the upper limit of this range or falling below the lower limit thereof. Thus, averaging of the phase accumulated values $d_{1,i}$ and $d_{2,i}$ needs to be performed with taking the wrapping into account. In this embodiment, since initial values of the phase accumulated values $d_{1,i}$ and $d_{2,i}$ are both zero, the phase accumulated values $d_{1,i}$ and $d_{2,i}$ are approximately the same.

Therefore, when a difference between the values $d_{1,i}$ and $d_{2,i}$ is beyond 180 degrees, one and the other of these values are regarded as respectively being in the range and out of the range, and the averaging is performed on a sum of $d_{1,i}$ and $d_{2,i}$ after addition of 360 degrees to the sum is made. The rotation angle $\theta$ is calculated by following expressions (8) and (9):

$$\theta = \begin{cases} \text{AVERAGE}(d_{1,i}, d_{2,i}) & tl \leq r_{1,i} \leq th \text{ and } tl \leq r_{2,i} \leq th \\ d_{1,i} & tl \leq r_{1,i} \leq th \text{ and } r_{2,i} < tl, \text{ or} \\ & tl \leq r_{1,i} \leq th \text{ and } r_{2,i} > th \\ d_{2,i} & r_{1,i} < tl \text{ and } tl \leq r_{2,i} \leq th, \text{ or} \\ & r_{1,i} > th \text{ and } tl \leq r_{2,i} \leq th \\ -0.01 & \text{other cases} \end{cases} \quad (8)$$

$$\text{AVERAGE}(x, y) = \begin{cases} \frac{x+y}{2} & |x-y| < 180 \\ \text{MOD}\left(\frac{x+y+360}{2}, 360\right) & \text{other cases} \end{cases} \quad (9)$$

The rotation angle $\theta$ thus calculated is output from the signal processor 30 and used by a controller (not illustrated) of the apparatus to detect and control a rotational amount (movement amount), a rotational position or a rotational velocity of the rotation axis 50.

Although this embodiment described the rotary encoder as an example, an alternative embodiment of the present invention is a linear encoder. Although this embodiment described the optical reflective encoder as an example, an alternative embodiment of the present invention is an encoder that applies a different detecting method, such as an optical transmissive encoder, a magnetic encoder and an electromagnetic induction encoder. Moreover, although this embodiment described the case in which the two-phase signals mutually orthogonal sinusoidal signals are output from the sensor, they do not necessarily have to be two-phase signals as long as a phase is detectable, and may be three-phase signals or triangular wave signals.

Furthermore, although this embodiment described the case of calculating the phase by the arc tangent calculation, any parameter other than the phase may be calculated as long as it indicates a position in a certain range.

Moreover, although this embodiment described the case of expressing the phase in 8 bits, the phase may be expressed in a range other than a power-of-two range or in a numerical value including a floating decimal point.

In addition, although this embodiment described the case of calculating the amplitude of the two-phase signals from a pair of the digital signals, the amplitude may be calculated from multiple pairs of digital signals. For example, a difference between a maximum value and a minimum value of the pairs of digital signals may be evaluated, or a radius of a circle calculated from the pairs of digital signals by a least-squares method may be evaluated. The evaluation based on such multiple samples can reduce a radius detection error such as an interpolation error.

Moreover, although this embodiment described the case in which the operation period of the AD convertors is constant, it does not necessarily have to be constant. They may be configured to operate in response to an external request or to dynamically change the period depending on a velocity. Reducing operation frequencies of the AD convertors can reduce electrical power consumption.

Furthermore, although this embodiment described the configuration in which the number of periods of the two-phase signals is counted by the phase accumulation, another configuration may be employed in which a counter that counts the number of periods is separately provided and the movement amount may be calculated from a combination of a value of the counter and the phase. In this case, counting the number of periods from an analog signal enables detection of the movement amount even when a movement velocity is sufficiently fast as compared to the operation periods of the AD convertor.

In addition, although this embodiment described the case of accumulating the phase, the phase does not necessarily have to be detected. From a viewpoint that embodiments of the present invention aim at acquiring the movement amount, the movement amount may be acquired, for example, by using a sensor whose output signal changes depending on a relative velocity between the sensor and the scale, by evaluating the output signal from the sensor at a predetermined time interval and by uniquely calculating the movement amount from the velocity corresponding to the output signal and the number of the time intervals. Such acquisition of the movement amount is equivalent to detection of the movement amount. Thus, employing such a sensor achieves a configuration that accumulates the movement amount without detecting the phase.

Furthermore, although this embodiment described the case in which the phase accumulated value to which 0 is given as its initial value continuously changes with changes of the phase, the phase accumulated values may be reset in response to each movement across a reference position additionally provided. In this case, even when the movement amount is lost due to, for example, shut down of power to the encoder, providing a movement amount after passing the reference position again such that the detected value of the movement amount becomes the same as that before the lost enables reproducing a substantially same relative positional relation as that before the lost. Moreover, a configuration may be employed which includes a communication interface such as a signal line to an external system to reset the phase accumulated value through the external system. Furthermore, the resetting may be performed only on the number of the periods such that a lower bit of the accumulated value corresponds to the phase. This configuration can enhance reproducibility of the position represented by the accumulated value. The configuration is useful in, for example, a robotic arm, especially when expansion and contraction of a chassis causes a system positional error, which requires a mapping between theoretical coordinates and coordinates in an actual use environment.

Furthermore, although this embodiment described the case in which the two unit converters are provided to perform the conversion to unify the units of the two phase accumulated values, such unit conversion does not necessarily have to be performed on all phase accumulated values. In addition, although this embodiment described the case in which the unit conversion is performed such that the phase accumulated value has the unit of 0.01 degree, such unit conversion needs not to be performed in a case where, for example, the number of gratings in one round of the track 11 is 360 and the phase is ranged from 0 to 99, because in this case a phase accumulated value of 1 corresponds to 0.01 degree.

Moreover, although the amplitude is used as criterion to determine the probability that the movement amount is abnormal in this embodiment, a different criterion may be used. For example, the criterion may be a change rate of the amplitude or a phase difference between the two-phase signals. When a sufficient reliability of the movement amount is secured or not required, the movement amount detector 36 may be configured to always calculate an average position. This configuration simplifies the process performed by the movement amount detector 36.

Furthermore, although this embodiment described the case in which the movement amount detector 36 selects, depending on the amplitudes, whether to use the phase accumulated value to detect the movement amount (in other words, to perform a discontinuous weighting), the movement amount may be detected by a continuous weighting based on the amplitudes without performing such a selection. The selective use (that is, the discontinuous weighting) of the phase accumulated values for the movement amount detection when either amplitude is near the upper or lower limit of the normal range causes the detected movement amount to be discontinuous at a switching of the use in some cases. However, the continuous weighting depending on the amplitudes to detect the movement amount can suppress such a discontinuity.

Embodiment 2

Figure 6:
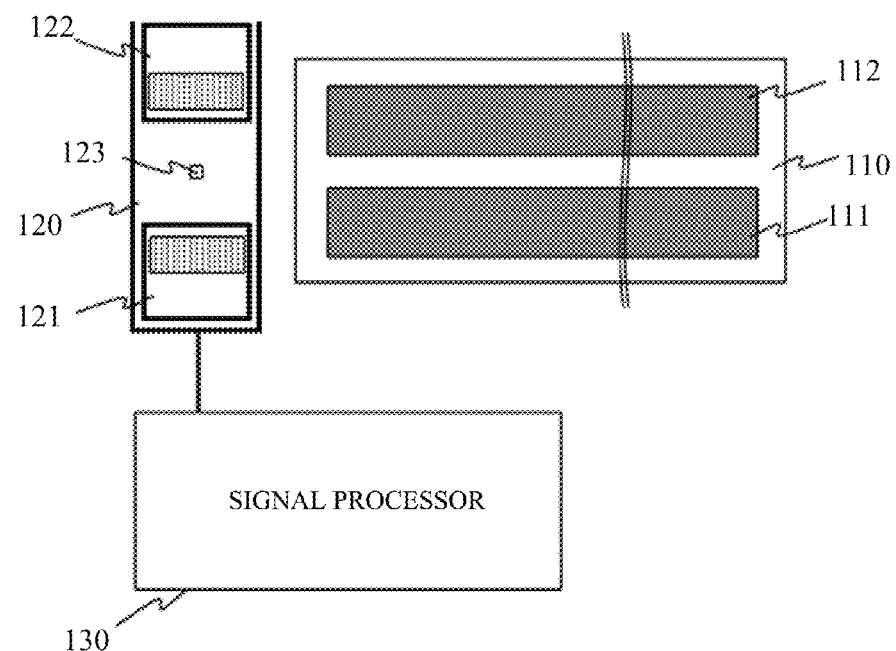
FIG. 6 illustrates a configuration of an encoder that is Embodiment 2 of the present invention.

Next, description will be made of an encoder that is Embodiment 2 of the present invention. As illustrated in FIG. 6, the encoder of this embodiment includes a scale 110, a sensor 120 and a signal processor 130. The encoder of this embodiment is mounted on various apparatuses including optical apparatuses such as an interchangeable lens and an image pickup apparatus, a robotic arm and a carrier apparatus. The scale 110 is attached to a movable member in any apparatus described above so as to integrally move therewith, and the sensor 120 is attached to a fixing member such as a casing of the apparatus. The encoder of this embodiment is an absolute encoder that detects an absolute position of the scale 110 (that is, of the movable member) and is a linear encoder.

Figure 7:
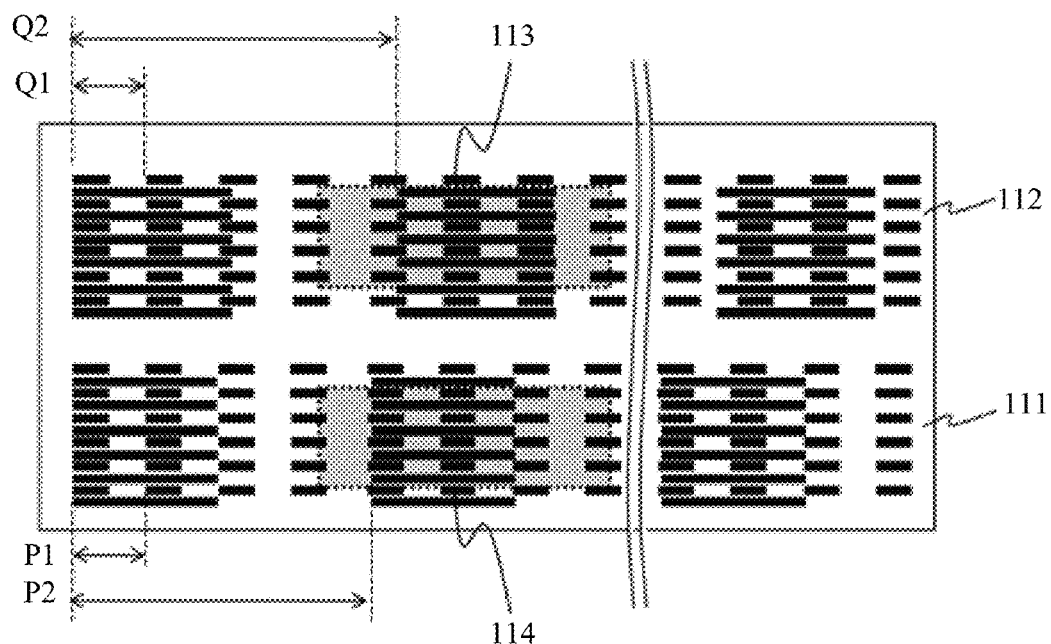
FIG. 7 illustrates periodic patterns of a scale in the encoder of Embodiment 2.

In this embodiment, multiple (two also in this embodiment) tracks 111 and 112 are provided on the scale 110 so as to extend in a longitudinal direction (in other words, a moving direction relative to the sensor 120; hereinafter referred to as "a detection direction") of the scale 110. As illustrated in FIG. 7, each track is provided with multiple (two in this embodiment) periodic patterns having mutually different periods and arranged alternately in a direction (hereinafter, referred to as "a scale width direction") orthogonal to the detection direction. Specifically, the track 111 is provided with a periodic pattern having a period P1 and a periodic pattern having a period P2 that are alternately and multiply arranged in the scale width direction. The track 112 is provided with a periodic pattern having a period Q1 and a periodic pattern having a period Q2 that are alternately and multiply arranged in the scale width direction. Each periodic pattern includes a reflective portion (black portion in FIG. 7) as gratings and a non-reflective portion (white portion in FIG. 7) that are alternately arranged in the detection direction, as in Embodiment 1.

Total lengths of the two tracks 111 and 112 (hereinafter referred to as the track total length) are equal to each other. The numbers of the gratings of the periodic patterns having the periods P1 and P2 in the track 111 are respectively 160 and 40, and the number of gratings of the periodic patterns having the periods Q1 and Q2 in the track 12 are respectively 152 and 39. Thus, the period P1 and the period Q1 are approximately equal to each other, the period P2 and the period Q2 are approximately equal to each other. The period P2 and the period Q2 are respectively four times larger than the period P1 and the period Q1.

Multiple (two) light receivers 121 and 122 and one light source 123 are arranged on a same plane on the sensor 120.

Light emitted from the light source 123 is projected onto the track 111 and reflected by the reflective portion of the track 111. The reflected light is received by the light receiver 121. Light emitted from the light source 123 is projected onto the track 112 and reflected by the reflective portion of the track 112. The reflected light is received by the light receiver 122. The light receivers 121 and 122 each include a light-receiving element array including multiple light-receiving elements arranged in the detection direction. When the scale 110 and the sensor 120 are relatively moved, an intensity of the reflected light received by each light-receiving element in the light receivers 121 and 122 changes depending on the relative movement amount. The sensor 120 outputs a sinusoidal signal (first periodic signal) whose value periodically changes with change of the light-receiving intensity in the light receiver 121 and outputs a sinusoidal signal (second periodic signal) whose value periodically changes with change of the light receiving intensity in the light receiver 122.

More specifically, in FIG. 7, areas 113 and 114 each enclosed by a dotted line are areas that reflect, of the light emitted from the light source 123 and projected onto the tracks 111 and 112, lights reaching the light receivers 121 and 122. The areas 113 and 114 are respectively set to include the periodic patterns multiply arranged in the scale width direction on the tracks 111 and 112. This embodiment also employs a reflective optical system in which the light source 123 and the light receivers 121 and 122 are arranged on the same plane on the sensor 120. Thus, an image (periodic pattern image) of each track projected onto each light receiver by the light projected from the light source 123 onto the track and reflected thereby has a doubled size of the track on the scale 110. That is, the width of $\lambda/2$ in the detection direction on each light receiver corresponds to $\lambda/4$ on the corresponding track.

Moreover, in this embodiment, a detection period which is a period of extracting signals from the light-receiving elements for reading the periodic patterns by the light receivers 121 and 122 can be switched. Specifically, in this embodiment, the detection period can be switched between $\lambda$ sufficiently close to the periods P1 and Q1 and $4\lambda$ sufficiently close to the periods P2 and Q2. Switching of the detection period is performed by switching how to extract the signals from the light-receiving elements. When the detection period is set to $\lambda$, how to extract the signals described in Embodiment 1 with reference to FIG. 4A is used. On the other hand, when the detection period is set to $4\lambda$, as illustrated in FIG. 4B, the multiple light-receiving elements in each light receiver are divided into four groups each constituted by four adjacent light-receiving elements, and outputs from the four groups of the light-receiving elements are extracted as A(+), B(+), A(−) and B(−) in order in the detection direction. In either case in which the detection period is $\lambda$ or $4\lambda$, differences below are calculated:

$$A = A(+) - A(-)$$

$$B = B(+) - B(-)$$

In this manner, the light receiver 121 whose detection period is set to $\lambda$ reads the periodic pattern having the period P1 and outputs two-phase signals (A and B) as the first periodic signals. The light receiver 122 whose detection period is set to $\lambda$ reads the periodic pattern having the period Q1 and outputs two-phase signals (A and B) as the first periodic signals. The light receiver 121 whose detection period is set to $4\lambda$ reads the periodic pattern having the period P2 and outputs two-phase signals (A and B) as the second periodic signals. The light receiver 122 whose detection period is set to $4\lambda$ reads the periodic pattern having the period Q2 and outputs two-phase signals (A and B) as the second periodic signals. In this manner, switching of the detection period of the light receivers 121 and 122 causes each light receiver to output two pairs of the two-phase signals (that is, four pairs of the two-phase signals in total).

Figure 8:
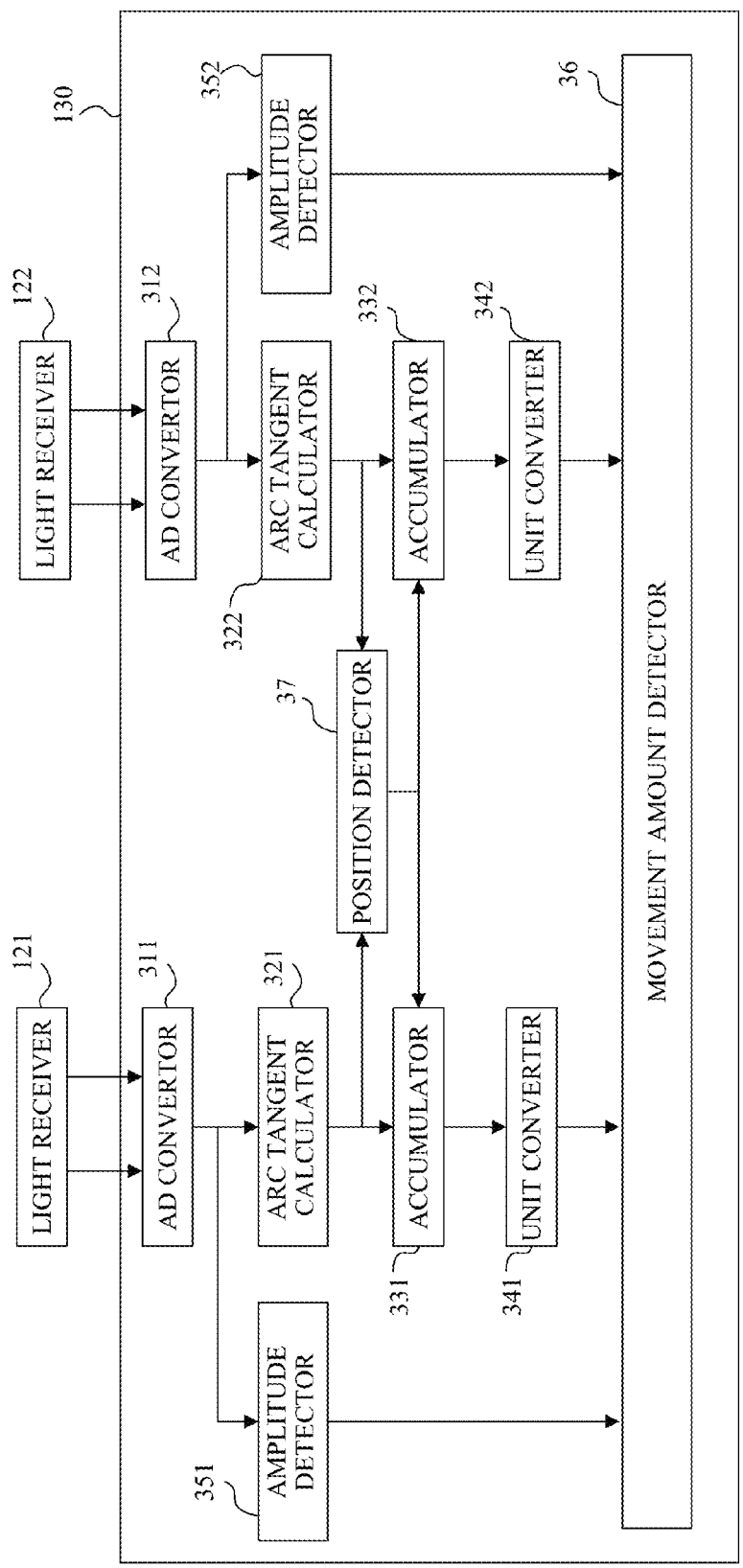
FIG. 8 illustrates a configuration of a signal processor in the encoder of Embodiment 2.

The encoder of this embodiment is, as mentioned above, an absolute encoder which detects not a movement amount but a position. As illustrated in FIG. 8, the signal processor 130 includes, in addition to the AD convertors 311 and 312, the arc tangent calculators 321 and 322, the accumulators 331 and 332, the unit converters 341 and 342, the amplitude detectors 351 and 352 and the movement amount detector 36 described in Embodiment 1, a position detector 37. The position detector 37 detects a position from phases calculated by the arc tangent calculators 321 and 322. Each of the accumulators 331 and 332 sets an initial value of a phase accumulated value by using the position detected by the position detector 37.

More specifically, the position detector 37 calculates the position by using phases obtained from the four pairs of the two-phase signals corresponding to the periodic patterns having the periods P1 and P2 and the periods Q1 and Q2 included in the tracks 11 and 12.

First, similarly to Embodiment 1, the detection periods of the light receivers 121 and 122 are set to $\lambda$, and the two pairs of the two-phase signals (analog signals) output from the light receivers 121 and 122 that respectively read the periodic patterns having the periods P1 and Q1 are converted into digital signals by the AD convertors 311 and 312. Then, each of the arc tangent calculators 321 and 322 calculates a phase of the two-phase signals as the digital signals output from each of the AD convertors 311 and 312. Next, the detection periods of the light receivers 121 and 122 are set to $4\lambda$, and the two pairs of the two-phase signals (analog signals) output from the light receivers 121 and 122 that read the periodic patterns having the periods P2 and Q2 are converted into digital signals by the AD convertors 311 and 312. Then, each of the arc tangent calculators 321 and 322 calculate a phase of the two-phase signals as the digital signals output from each of the AD convertors 311 and 312. In this manner, four phases corresponding to the periods P1, P2, Q1 and Q2 are acquired. The phases corresponding to the periods P1 and P2, Q1 and Q2 are hereinafter respectively denoted by θP1, θP2, θQ1 and θQ2.

The periodic patterns having the periods P2 and Q2 respectively include 40 periods and 39 periods in the track total length. Thus, a phase difference between the phases θP2 and θQ2 is one period in the track total length. A phase in this one period in the track total length represents an absolute position. The phase difference is denoted by θV1 and represented by following expression (10). Also in this embodiment, a phase is expressed as a value from 0 to 255.

$$\theta V1 = \text{MOD}(\theta P2 - \theta Q2, 256) \quad (10)$$

The periodic patterns having the periods P1 and Q1 respectively include 160 periods and 152 periods in the track total length. Thus, a phase difference between the phases θP1 and θQ1 is 8 periods in the track totak length. The phase difference between the phases θP1 and θQ1 is denoted by θV8 and represented by following expression (11).

$$\theta V8 = \text{MOD}(\theta P1 - \theta Q1, 256) \quad (11)$$

Although θV1 represents an absolute position, θV8 has a higher accuracy in one period than that of θV1. Thus, in this embodiment, the position detector 37 calculates, from θV1 and θV8, an absolute position having the accuracy of θV8. This is achieved by calculating, from a phase relation between θV1 and θV8, the number of periods (hereinafter referred to as "a period number") from an edge of the track (hereinafter referred to as "a track edge") as a zero-th period to θV8.

For example, when there are 8 periods in the track total length and the period number of θV8 is 0, that is, θV8 represents a phase corresponding to a period closest to the track edge, the absolute position is θV8/8. When the period number is 3, that is, a phase corresponds to the fourth period from the track edge, the absolute position is 3×L/8+θV8/8 where L represents the track total length.

Figure 9A:
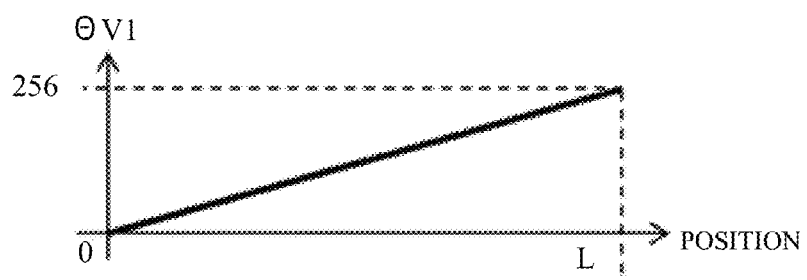
FIGS. 9A to 9C illustrate relation between movement amount (position) and signals in the encoder of Embodiment 2.
Figure 9B:
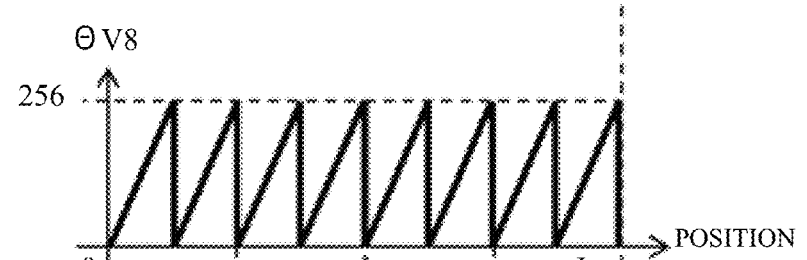
Figure 9C:
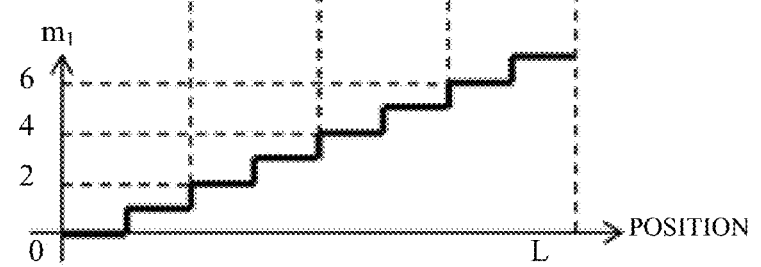

Since, as illustrated in FIG. 9, θV8 changes 8 times from 0 to 255 in the track total length while θV1 changes continuously from 0 to 255 in the track total length, a change amount of the phase of θV1 per unit movement amount is ⅛ of that of θV8. Thus, as shown in following expressions (12) and (13), a difference between 8×θV1 and θV8 is divided by 256, and the resulting quotient is rounded to an integer to obtain a period number m1. Then, an absolute position x1 having the accuracy of θV8 is calculated using m1.

$$m_1 = \text{ROUND}\left(\frac{8 \times \theta V1 - \theta V8}{256}\right) \quad (12)$$

$$x_1 = m_1 \times \frac{256}{8} + \frac{\theta V8}{8} \quad (13)$$

Similarly, an absolute position x2 having an accuracy of θP2 is calculated from x1 and θP2, and an absolute position x3 having an accuracy of θP1 is calculated from x2 and θP1, as shown in following expressions (14) to (17). In these expressions, m2 and m3 respectively represent a period number of θP2 and a period number of θP1.

$$m_2 = \text{ROUND}\left(\frac{40 \times x_1 - \theta P2}{256}\right) \quad (14)$$

$$x_2 = m_2 \times \frac{256}{40} + \frac{\theta P2}{40} \quad (15)$$

$$m_3 = \text{ROUND}\left(\frac{160 \times x_2 - \theta P1}{256}\right) \quad (16)$$

$$x_3 = m_3 \times \frac{256}{160} + \frac{\theta P1}{160} \quad (17)$$

In this manner, the absolute position x3 is calculated. While the absolute position x3 is expressed as a value in the range from 0 to 256, the numbers of gratings of the periodic patterns having the periods P1 and Q1 are respectively 160 and 152. Therefore, the absolute position cannot be directly set as initial values of the accumulators 331 and 332. Thus, as shown in following expressions (18) and (19), by using the absolute position x3, initial values s1 and s2 of the accumulators 331 and 332 corresponding to the numbers of gratings of the periodic patterns having the periods P1 and Q1 are calculated.

$$s_1 = 256 \times \text{ROUND}\left(x_3 \times \frac{160}{256} - \frac{\theta P1}{256}\right) + \theta P1 \quad (18)$$

$$s_2 = 256 \times \text{ROUND}\left(x_3 \times \frac{152}{256} - \frac{\theta Q1}{256}\right) + \theta Q1 \quad (19)$$

The initial values thus calculated are set to the accumulators 331 and 332, and the signal processor 130 subsequently performs the same processes as those performed by the signal processor 30 in Embodiment 1.

In this embodiment, since the initial value of each of the accumulators 331 and 332 represents an absolute position, a value obtained by adding the phase accumulated value as a movement amount to the initial value also represents an absolute position. Thus, the encoder of this embodiment functions as an absolute encoder.

Similarly to Embodiment 1, the process described in this embodiment is also applicable to a case of using a different method of signal detection or phase detection, a case of using a different phase expression range and the like.

Embodiment 3

Figure 10:
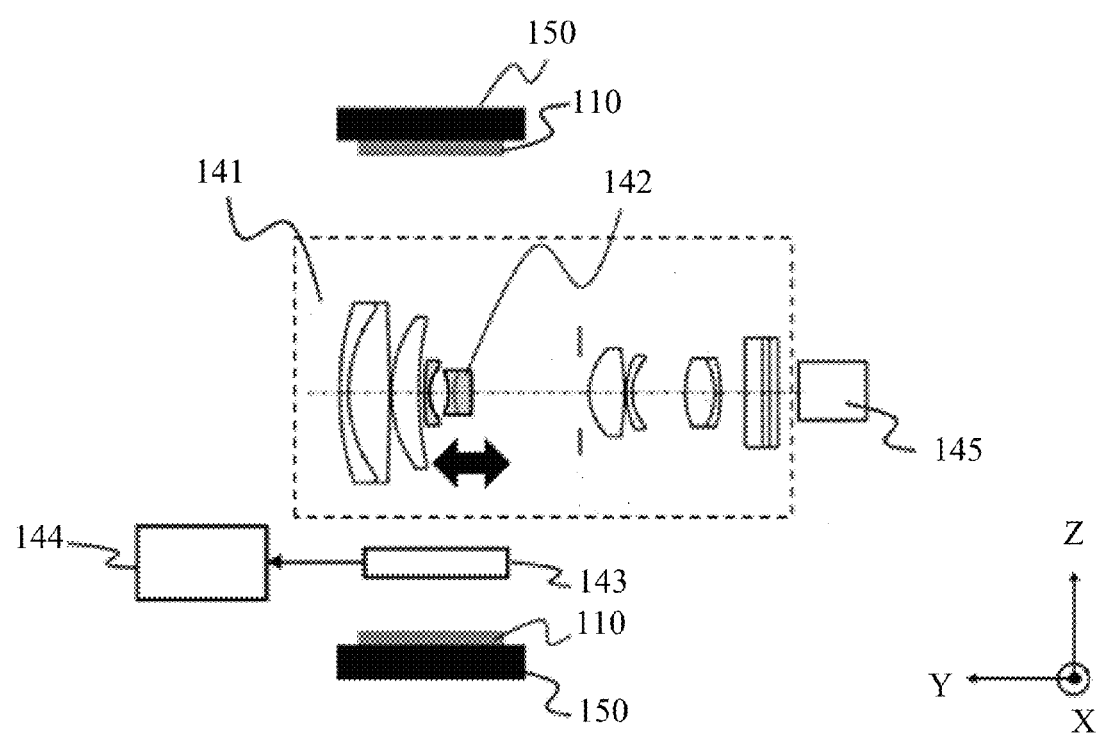
FIG. 10 illustrates an image pickup apparatus that is Embodiment 3 of the present invention.

FIG. 10 illustrates, as an exemplary apparatus mounted with the encoder described in Embodiment 2, an image pickup apparatus (optical apparatus) such as a digital still camera or a video camera. This image pickup apparatus includes the encoder so as to detect an absolute position of a movable lens in its lens barrel.

In FIG. 10, reference numeral 110 denotes a scale, reference numeral 120 denotes a sensor, reference numeral 130 denotes a signal processor; these components constitute the encoder of Embodiment 2. The scale 110 is attached to an inner surface of a cylindrical cam ring (movable member) 150 that rotates about an optical axis in the lens barrel. The cam ring 150 is driven to rotate by an actuator (not illustrated).

The lens barrel houses an image taking optical system 151. The image taking optical system 151 includes a lens (for example, a magnification-varying lens or a focus lens) 152 movable in a direction (optical axis direction) in which the optical axis extends by a cam formed in the cam ring 150 with rotation of the cam ring 150.

Reference numeral 155 denotes a CPU that controls the whole system of the image pickup apparatus. Reference numeral 156 denotes an image sensor (image pickup element) that photoelectrically converts an object image formed by the image taking optical system 151. The image sensor 156 is constituted by a photoelectric conversion element such a CCD sensor or a CMOS sensor.

When the cam ring 150 rotates to move the movable lens 152, the encoder detects an absolute rotational position of the cam ring 150 (that is, the absolute position of the movable lens 152 in the optical axis direction), and information on the detected absolute rotational position is output to the CPU 155.

The CPU 155 drives, on a basis of the information on the absolute rotational position, the actuator that rotates the cam ring 150, thereby moving the movable lens 152 to a target position.

Each of the embodiments can accurately calculate a relative movement (detected movement amount) between the scale and the sensor irrespective of phase relations among the multiple periodic patterns whose periods are mutually different. Since the relative movement amount is calculated by using the periodic patterns, a detection error caused by a relative positional shift between the scale and the sensor can be reduced.

The encoders of the above-described embodiments can be used not only for the image pickup apparatus described in Embodiment 3, but also for various apparatuses such as a printer (optical apparatus) performing a position detection of a print head and a feed roller therein by using an encoder, a copier (optical apparatus) performing a rotational position detection of a photoconductive drum therein by using an encoder, and a robotic arm and a carrier apparatus performing a position detection thereof by using an encoder.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-003450, filed on Jan. 10, 2014, which is hereby incorporated by reference herein in its entirety.

What is claimed is:

1. An encoder comprising:
   a scale provided with multiple periodic patterns having mutually different periods;
   a sensor configured to be movable relative to the scale and to output, with a relative movement therebetween, multiple periodic signals periodically changing respectively corresponding to the periods of the periodic patterns; and
   a signal processor configured to calculate, by using the periodic signals, a detected movement amount as a detected value of a relative movement amount between the scale and the sensor,
   wherein the signal processor (a) calculates, by using each of the periodic signals, an accumulated movement amount which is an accumulated value of the relative movement amount between the scale and the sensor in units of one over an integer of the period of the periodic pattern corresponding to the periodic signal used, (b) unifies the units of the accumulated movement amounts calculated by using the respective periodic signals, and (c) calculates the detected movement amount from the accumulated movement amounts with the unified units.

2. An encoder according to claim 1, wherein the signal processor calculates the accumulated movement amount as an accumulated value of the relative movement amounts calculated per predetermined time.

3. An encoder according to claim 1,
   wherein:
   each of the periodic patterns in the scale is arranged in a ring shape, and
   the signal processor (a) calculates a phase in a predetermined range from each of the periodic signals, (b) accumulates change amounts of the phase to acquire the accumulated movement amount, and (c) performs, when detecting a wrapping of the phase, a process to convert the phase to a value within the predetermined range.

4. An encoder according to claim 1,
   wherein the signal processor (a) detects an amplitude of each of the periodic signals, and (b) calculates the detected movement amount by weighted averaging of the accumulated movement amounts based on the amplitude.

5. An encoder according to claim 1,
   wherein the signal processor (a) calculates, by using the respective periodic signals, initial absolute positions as initial values of the accumulated movement amounts, and (b) adds the accumulated movement amounts respectively to the initial absolute positions.

6. An apparatus comprising:
   an encoder; and
   a movable member whose movement amount or position is detected by the encoder,
   wherein the encoder comprises:
   a scale provided with multiple periodic patterns having mutually different periods;
   a sensor configured to be movable relative to the scale and to output, with a relative movement therebetween, multiple periodic signals periodically changing respectively corresponding to the periods of the periodic patterns; and
   a signal processor configured to calculate, by using the periodic signals, a detected movement amount as a detected value of a relative movement amount between the scale and the sensor,
   wherein the signal processor (a) calculates, by using each of the periodic signals, an accumulated movement amount which is an accumulated value of the relative movement amount between the scale and the sensor in units of one over an integer of the period of the periodic pattern corresponding to the periodic signal used, (b) unifies the units of the accumulated movement amounts calculated by using the respective periodic signals, and (c) calculates the detected movement amount from the accumulated movement amounts with the unified units.

7. An encoder calculation method applied to an encoder comprising:
   a scale provided with multiple periodic patterns having mutually different periods; and
   a sensor configured to be movable relative to the scale and to output, with a relative movement therebetween, multiple periodic signals periodically changing respectively corresponding to the periods of the periodic patterns,
   the method being used to calculate, by using the periodic signals, a detected movement amount as a detected value of a relative movement amount between the scale and the sensor,
   wherein the method comprises:
   calculating, by using each of the periodic signals, an accumulated movement amount which is an accumulated value of the relative movement amount between the scale and the sensor in units of one over an integer of the period of the periodic pattern corresponding to the periodic signal used,
   unifying the units of the accumulated movement amounts calculated by using the respective periodic signals, and
   calculating the detected movement amount from the accumulated movement amounts with the unified units.

8. A non-transitory computer-readable storage medium storing an encoder calculation program as a computer program to be used for an encoder comprising:
   a scale provided with multiple periodic patterns having mutually different periods;
   a sensor configured to be movable relative to the scale and to output, with a relative movement therebetween, multiple periodic signals periodically changing respectively corresponding to the periods of the periodic patterns; and
   a signal processor to which the periodic signals are input,
   the program causing the signal processor as a computer to perform a process to calculate, by using the periodic signals, a detected movement amount as a detected value of a relative movement amount between the scale and the sensor,
   wherein the process comprising:
   calculating, by using each of the periodic signals, an accumulated movement amount which is an accumulated value of the relative movement amount between the scale and the sensor in units of one over an integer of the period of the periodic pattern corresponding to the periodic signal used, unifying the units of the accumulated movement amounts calculated by using the respective periodic signals, and calculating the detected movement amount from the accumulated movement amounts with the unified units.

* * * * *